(12) United States Patent
Lin et al.

(10) Patent No.: US 8,379,331 B2
(45) Date of Patent: Feb. 19, 2013

(54) LENS MODULE

(75) Inventors: Hou-Yao Lin, Taipei Hsien (TW);
Sheng-Jung Yu, Taipei Hsien (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 324 days.

(21) Appl. No.: 12/944,766

(22) Filed: Nov. 12, 2010

(65) Prior Publication Data

US 2011/0317290 A1    Dec. 29, 2011

(30) Foreign Application Priority Data

Jun. 23, 2010   (TW) .............................. 99120344 A

(51) Int. Cl.
*G02B 7/02* (2006.01)
(52) U.S. Cl. ...................................................... 359/819
(58) Field of Classification Search .................. 359/811, 359/819, 830
See application file for complete search history.

(56) References Cited

U.S. PATENT DOCUMENTS 7,417,808 B2 *   8/2008   Noda et al. .................... 359/819

* cited by examiner

*Primary Examiner* — Joseph P Martinez
(74) *Attorney, Agent, or Firm* — Altis Law Group, Inc.

(57) ABSTRACT

A lens module includes a lens barrel and two lenses. The lens barrel has two opposite end surfaces, and a receiving hole through the two end surfaces. The receiving hole has a center axis. A ring-shaped block is formed on an inside surface of the lens barrel, and is coaxial with the receiving hole. The ring-shaped block has two contact surfaces adjacent to the two end surfaces, respectively. Each of the lenses includes an optical axis and a fixing portion. Each fixing portion has a contact surface. The contact surface of the lens has a shape matching the contact surface of the ring-shaped block, and is coaxial with the optical axis of the lens. The contact surfaces of the lenses contact tightly with the contact surfaces of the ring-shaped block.

10 Claims, 6 Drawing Sheets

LENS MODULE

BACKGROUND

1. Technical Field

The disclosure relates to image capture, and particularly to a lens module having high assembly yield.

2. Description of the Related Art

Digital cameras, video recorders, and mobile phones having video function have a trend of microminiaturization. However, the image quality of objects also has higher requirements. The image quality of objects is determined by whether an optical axis of each lens in the lens module aligns mutually. Referring to FIG. 1, a commonly used lens module 10 includes a lens barrel 12, a first lens 14, a spaced ring 18, and a second lens 16 sequentially arranged into the lens barrel 12. However, during the fabricating process of the lens module 10, the optical axis of the first lens 14 and the optical axis of the second lens 16 are not always aligned mutually. Thus, that will affect the image quality of object and decrease the assembly yield of lens module 10.

Therefore, it is desirable to provide a lens module which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present lens module. Moreover, in the drawings, like reference numerals designate corresponding parts throughout the views.

DETAILED DESCRIPTION

Embodiments of a lens module as disclosed are described in detail here with reference to the drawings.

Figure 1:
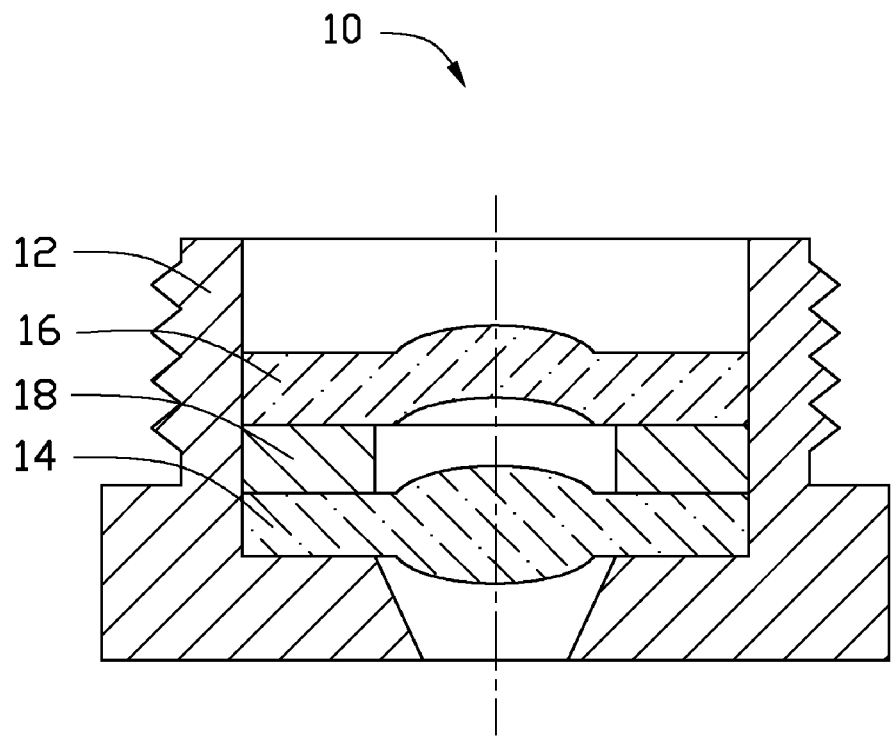
FIG. 1 is a cross section of a commonly used lens module.
Figure 2:
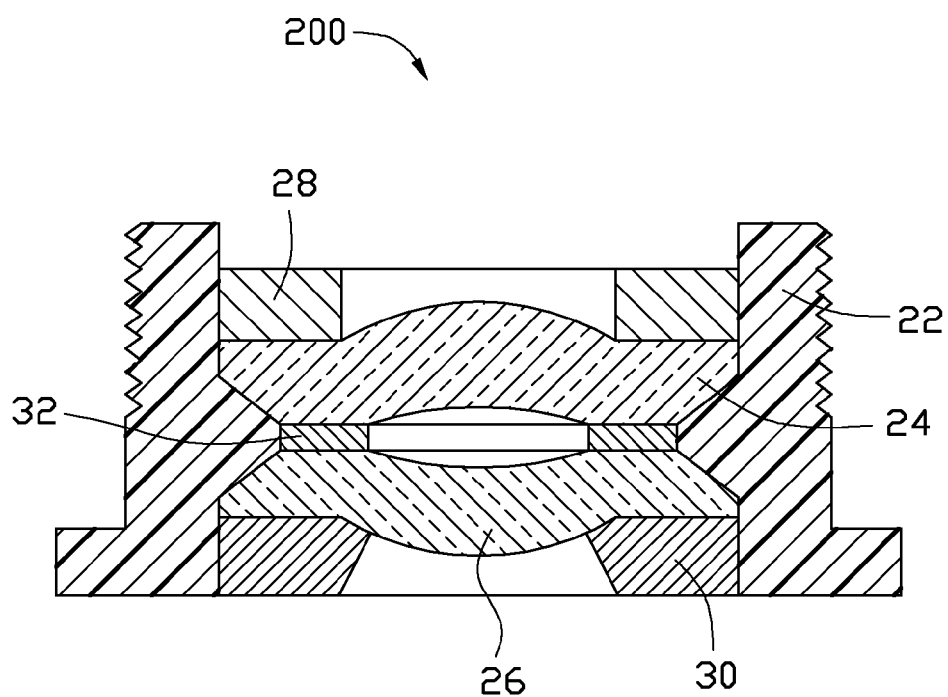
FIG. 2 is a cross section of a lens module in accordance with a first embodiment.
Figure 3:
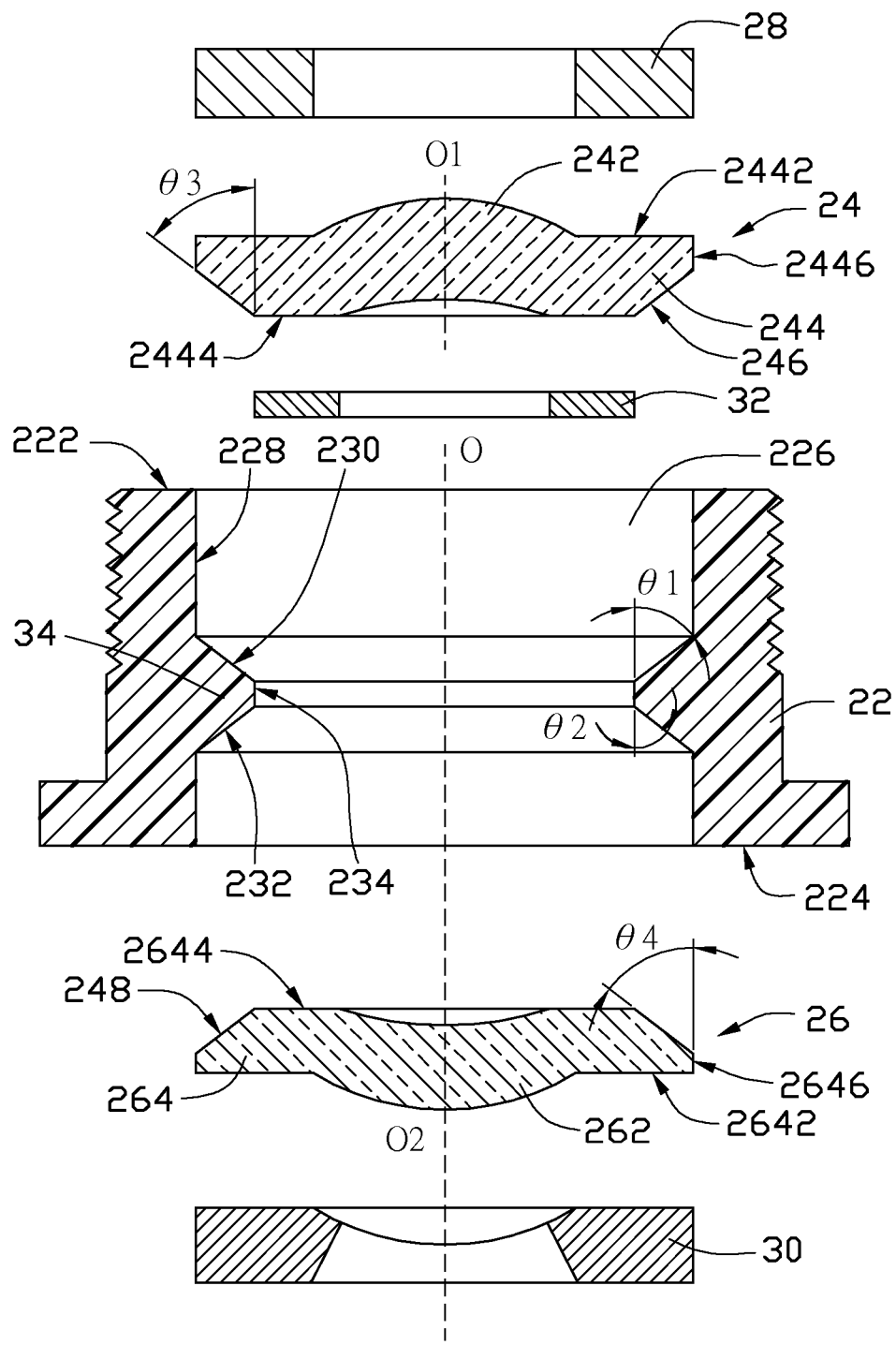
FIG. 3 is an exploded view of the lens module of FIG. 2.

Referring to FIGS. 2 and 3, a lens module 200 includes a lens barrel 22, a first lens 24, a second lens 26, a first pressing piece 28, a second pressing piece 30, and a spaced ring 32.

The lens barrel 22 which is cylindrical including a first end surface 222 and a second end surface 224 opposite to the first end surface 222. The lens barrel 22 has a receiving hole 226 through the first end surface 222 and the second surface 224 of the lens barrel 22.

The receiving hole 226 is cylindrical and has a center axis O. The diameter of opening of the first end surface 222 and the second surface 224 exceeds the maximum diameter of the first lens 24 and the second lens 26.

A ring-shaped block 34 is formed on the inside surface 228 of the lens barrel 22 protruding from periphery toward the center axis O. The ring-shaped block 34 has a first contact surface 230 adjacent to the first end surface 222, a second contact surface 232 adjacent to the second end surface 224 and a spaced surface 234 connecting to the first contact surface 230 and the second contact surface 232.

The first contact surface 230 and the second contact surface 232 respectively have a truncated cone shape. A center axis of the first contact surface 230 and the second contact surface 232 respectively overlap with the center axis O.

The radius of cross section of the first contact surface 230 gradually decreases away from the first end surface 222. The radius of cross section of the second contact surface 232 gradually decreases away from the second end surface 224. The included angle θ1 is between the first contact surface 230 and the center axis O. The included angle θ2 is between the second contact surface 232 and the center axis O. In this embodiment, the spaced surface 234 is cylindrical and parallel to the center axis O.

The first lens 24 includes a first optical portion 242 and a first fixing portion 244 surrounding the first optical portion 242. The first optical portion 242 has an optical axis O1. The fixing portion 244 has a first surface 2442 and a second surface 2444 opposite to the first surface 2442. The first surface 2442 is parallel to the second surface 2444.

The first surface 2442 and the second surface 2444 are perpendicular to the optical axis O1 of the first optical portion 242. The first fixing portion 244 has a first connecting surface 2446 and a third contact surface 246. The third contact surface 246 and the second surface 2444 intersect mutually. The first connecting surface 2446 is an outside surface of the first fixing portion 244. The first connecting surface 2446 connects to the third contact surface 246 and the first surface 2442 and is between the third surface 246 and the first surface 2442. In this embodiment, the first connecting surface 2446 is a cylindrical surface. The third contact surface 246 angles away from the optical axis O1. An included angle O3 is between the contact surface 246 and the optical axis O1 of the first optical portion 242. The included angle θ3 is equal to the included angle θ1.

The second lens 26 includes a second optical portion 262 having an optical axis O2 and a second fixing portion 264 surrounding the second optical portion 262. The second fixing portion 264 has a structure similar with the first fixing portion 244. The second fixing portion 264 has a third surface 2642 corresponding to the first surface 2442 and a fourth surface 2644 corresponding to the second surface 2442. The second connecting surface 2646 corresponding to the first connecting surface 2446 is between the third surface 2642 and the fourth surface 2644.

An included angle θ4 is between the fourth contact surface 248 and the optical axis O2. The included angle θ4 is equal to the included angle θ2.

The first pressing piece 28 and the second pressing piece 30 which are rings respectively press the first lens 24 and the second lens 26. The opening of the second end surface 224 of the receiving hole 226 of the lens module 200 is an entrance of light. Thus, the second pressing piece 30 and the spaced ring 32 are preferably shading material. The spaced ring 32 is utilized to separate the first lens 24 and the second lens 26 and shade a part of light entering the lens module 200.

The third contact surface 246 of the first lens 24 contacts with the first contact surface 230 of the lens barrel 22. The fourth contact surface 248 of the second lens 26 contacts with the second surface 232 of the lens barrel 22. The spaced ring 32 is between the first lens 24 and the second lens 26. The outside surface of the spaced ring 32 contacts tightly with the spaced surface 234 of the ring-shaped block 34. The first pressing piece 28 and the second pressing piece 30 respectively contact tightly with the first surface 2442 of the first lens 24 and the third surface 2642 of the second lens 26 and press the first lens 24 and the second lens 26. Thus, the third contact surface 246 and the fourth contact surface 248 respectively contact tightly with the first contact surface 230 and the second contact surface 232.

The ring-shaped block 34 is formed inside the lens barrel 22 of the lens module 200 in this embodiment. The ring-shaped block 34 has the first contact surface 230 and the second contact surface 232 inclining along the center axis O of the receiving hole 226 of the lens barrel 22. The first lens 24 has the third contact surface 246 contacted tightly with the first contact surface 230. The second lens 26 has the fourth contact surface 248 contacted tightly with the second contact surface 232. By the first contact surface 230 and the third contact surface 246, the first lens 24 can be positioned precisely in the lens barrel 22. By the second contact surface 232 and the fourth contact surface 248, the second lens 26 can be positioned precisely in the lens barrel 22. Optical axes of the first lens 24 and the second lens 26 are aligned conveniently and precisely and assembly yield of the lens module 200 is increased.

Figure 4:
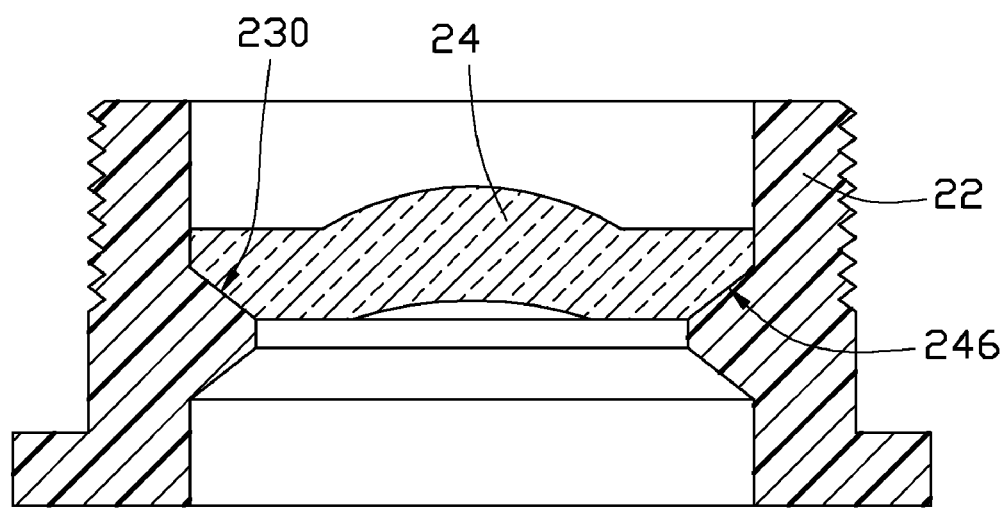
FIG. 4 is a schematic view of the lens module of FIG. 2 assembling a first lens into a lens barrel.
Figure 5:
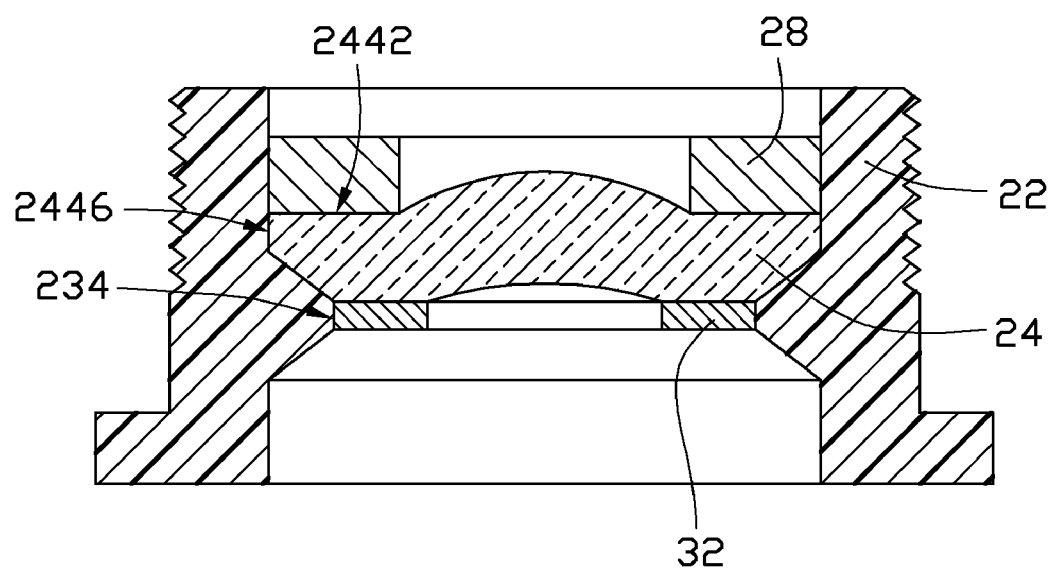
FIG. 5 is a schematic view of the lens module of FIG. 4 further assembling a first pressing piece and a spaced ring into the lens barrel.
Figure 6:
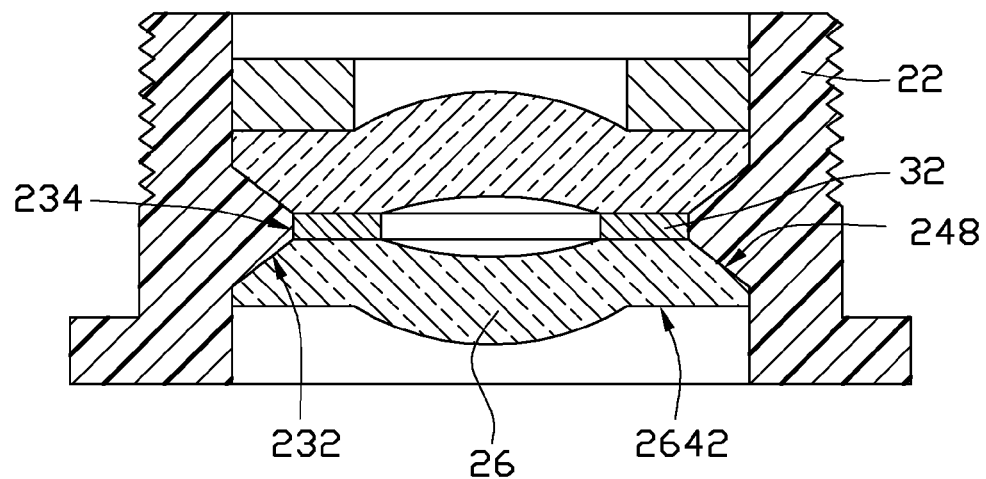
FIG. 6 is a schematic view of the lens module of FIG. 5 further assembling a second lens into the lens barrel.

Referring to FIGS. 4-6, a method for manufacturing lens module 200, includes steps: for the first step, assemble the first lens 24 into the lens barrel 22. Thus, the first contact surface 230 contacts tightly with the third contact surface 246.

For the second step, assemble the first pressing piece 28 into the lens barrel 22 and press the first surface 2442 of the first lens 24 as shown in FIG. 5. The first pressing piece 28 and the first lens 24 are fixed on the lens barrel 22 by adhesive. In this embodiment, the glue is arranged between the first connecting surface 2446 of the first lens 24 and the inside wall of the lens barrel 22, and between the outside surface of the first pressing piece 28 and the inside wall of the lens barrel 22.

Referring to FIG. 5, for the third step, assemble the spaced ring 32 into the lens barrel 22. The outside surface of the spaced ring 32 is opposite to the spaced surface 234 and is fixed by glue.

Referring to FIG. 6, for the fourth step, assemble the second lens 26 into the lens barrel 22. Thus, the second contact surface 232 contacts tightly with the fourth contact surface 248. Then, for the fifth step, assemble the second pressing piece 30 into the lens barrel 22 (see FIG. 2). Press the third surface 2642 of the second lens 26. The second pressing piece 30 and the second lens 26 are fixed in the lens barrel 22 by adhesive. Thus, the lens module 200 is complete.

The spaced surface 234 can be a truncated cone surface. The first contact surface 230 and the second contact surface 232 can intersect to be a circle line The third contact surface 246 of the first lens 24 can extend from the first surface 2442 to the second surface 2444. The fourth contact surface 248 of the second lens 26 can also extend from the third surface 2642 to the fourth surface 2644. At this time, the first connecting surface 2446 and the second connecting surface 2646 are omitted.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens module, comprising:
    a lens barrel having a first end surface, a second end surface opposite to the first end surface and an inside wall connected to the first end surface and the second end surface, wherein the inside wall of the lens barrel forms a cylindrical receiving hole through the first end surface and the second end face, the receiving hole has a center axis, a ring-shaped block formed on the inside wall of the lens barrel protruding from periphery toward the center axis and is coaxial with the receiving hole, the ring-shaped block has a first contact surface adjacent to the first end surface and a second contact surface away from the first end surface, the first contact surface and the second contact surface are truncated cone shape, the radius of cross section of the first contact surface gradually decreases away from the first end surface, and the radius of cross section of the second contact surface gradually decreases away from the direction of the second end surface;

a first lens including a first optical portion and a first fixing portion surrounding the first optical portion, wherein the first optical portion has a first optical axis, the first fixing portion has a third contact surface, the third contact surface is a truncated cone shape and coaxial with the first optical axis, the first lens is received into the lens barrel, the radius of cross section of the third contact surface gradually decreases away from the first end surface, and the third contact surface contacts tightly with the first contact surface; and a second lens including a second optical portion and a second fixing portion surrounding the second optical portion, wherein the second optical portion has a second optical axis, the second fixing portion has a fourth contact surface, the fourth contact surface is a truncated cone shape and coaxial with the second optical axis, the second lens is received into the lens barrel, the radius of cross section of the fourth contact surface gradually decreases away from the second end surface, and the fourth contact surface contacts tightly with the second contact surface.

2. The lens module of claim 1, wherein an included angle between the third contact surface and the first optical axis is equal to an included angle between the first contact surface and the center axis.

3. The lens module of claim 2, wherein an included angle between the fourth contact surface and the second optical axis is equal to an included angle between the second contact surface and the center axis.

4. The lens module of claim 3, further including a first pressing piece and a second pressing piece, the first pressing piece adjacent to the first end surface and contacted with the first fixing portion, the second pressing piece adjacent to the second end surface and contacted with the second fixing portion, the first fixing portion and the second fixing portion respectively press the first lens and the second lens so that the first contact surface contacts tightly with the third contact surface, and the second contact surface contacts tightly with the fourth contact surface.

5. The lens module of claim 4, wherein the first fixing portion has a first surface vertical to the first optical axis, the first surface is adjacent to and contacts with the first pressing piece, the second fixing portion has a second surface vertical to the second optical axis, the second surface is adjacent to and contacts with the second pressing piece.

6. The lens module of claim 4, wherein diameters of openings of the first end surface and the second end surface of the receiving hole respectively exceed diameters of the first lens and the second lens.

7. The lens module of claim 6, wherein the opening of the second end surface of the receiving hole is an entrance of light of the lens module, and the second pressing piece is shading material.

8. The lens module of claim 1, wherein the ring-shaped block has a spaced surface connecting to the first contact surface and the second contact surface.

9. The lens module of claim 8, further including a spaced ring, an outside surface of the spaced ring opposite and fixed to the spaced surface, and the spaced ring separating the first lens and the second lens.

10. The lens module of claim 9, wherein the spaced ring is shading material.

* * * * *